United States Patent
Hirata et al.

(10) Patent No.: US 11,670,997 B2
(45) Date of Patent: Jun. 6, 2023

(54) VIBRATION MOTOR

(71) Applicant: NIDEC CORPORATION, Kyoto (JP)

(72) Inventors: Atsunori Hirata, Kyoto (JP);
Tomohiro Hasegawa, Kyoto (JP);
Daisuke Adachi, Kyoto (JP); Hiroaki Hirano, Kyoto (JP); Hideki Nishimura, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 29 days.

(21) Appl. No.: 17/369,983

(22) Filed: Jul. 8, 2021

(65) Prior Publication Data

US 2022/0014082 A1 Jan. 13, 2022

(30) Foreign Application Priority Data

Jul. 10, 2020 (JP) .............................. JP2020-119456
Jan. 29, 2021 (JP) .............................. JP2021-013174

(51) Int. Cl.
*H02K 33/02* (2006.01)
(52) U.S. Cl.
CPC .................................. *H02K 33/02* (2013.01)
(58) Field of Classification Search
CPC .. H02K 7/1869; H02K 7/1876; H02K 7/1892; H02K 33/00; H02K 33/02; H02K 33/16; H02K 35/02; G06F 3/016; G06F 3/03545
USPC ........ 310/25, 15, 12.01, 81, 80, 321, 20, 21, 310/28–30, 36–37, 40 mm
See application file for complete search history.

(56) References Cited

U.S. PATENT DOCUMENTS

| | | | | |
|---|---|---|---|---|
| 2,906,898 | A * | 9/1959 | Missien | B25D 11/064 310/30 |
| 4,920,288 | A * | 4/1990 | den Heijer | F25B 9/14 310/90 |
| 5,924,975 | A * | 7/1999 | Goldowsky | A61M 60/148 600/16 |
| 7,504,794 | B2 * | 3/2009 | Sato | H02K 41/0356 318/135 |

(Continued)

FOREIGN PATENT DOCUMENTS

| | | | | |
|---|---|---|---|---|
| CN | 208675083 | | 3/2019 | |
| DE | 20160076344 | A * | 9/2015 | ............. H02K 33/02 |
| JP | 2020019011 | | 2/2020 | |

OTHER PUBLICATIONS

KR20160076344A English Translation.*

(Continued)

*Primary Examiner* — Maged M Almawri
(74) *Attorney, Agent, or Firm* — JCIPRNET (57) ABSTRACT

A vibration motor includes a stationary part, and a movable element which has a magnet and can vibrate in one direction. The stationary part includes a coil which applies a driving force to the magnet due to energization, a housing which houses the movable element and the coil therein, a first lid part which closes an end portion of the housing on one side in the one direction, and a first bearing part. The first bearing part is disposed inside the housing on the other side in the one direction from the first lid part. The first bearing part includes a bearing inner circumferential surface disposed with a gap therebetween with respect to an outer circumferential surface of a portion of the movable element on one side in the one direction.

12 Claims, 9 Drawing Sheets

(56) References Cited

U.S. PATENT DOCUMENTS

| | | | |
|---|---|---|---|
| 7,576,454 B2* | 8/2009 | Cheung | H02K 41/0356 |
| | | | 310/14 |
| 9,692,286 B2* | 6/2017 | Endo | H02K 33/16 |
| 9,692,287 B2* | 6/2017 | Yamamoto | H02K 35/02 |
| 11,258,343 B2* | 2/2022 | Harrison | H02K 41/03 |
| 2003/0185000 A1* | 10/2003 | Mah | H02K 35/02 |
| | | | 362/192 |
| 2005/0088842 A1* | 4/2005 | Mah | H02J 7/0045 |
| | | | 362/157 |
| 2005/0151375 A1* | 7/2005 | Cheung | B60C 23/041 |
| | | | 290/1 R |
| 2007/0052302 A1* | 3/2007 | Cheung | B82Y 25/00 |
| | | | 310/12.25 |
| 2009/0218894 A1* | 9/2009 | Aso | F16C 29/0685 |
| | | | 310/12.31 |
| 2011/0057629 A1* | 3/2011 | Lin | H02K 35/02 |
| | | | 322/3 |
| 2011/0169347 A1* | 7/2011 | Miyamoto | G06F 3/016 |
| | | | 310/12.21 |
| 2012/0062047 A1* | 3/2012 | Nakagawa | H02K 33/16 |
| | | | 310/17 |
| 2012/0086213 A1* | 4/2012 | Chan | H02K 7/088 |
| | | | 310/90 |
| 2012/0119593 A1* | 5/2012 | Yajima | H02K 41/031 |
| | | | 310/12.21 |
| 2013/0010999 A1* | 1/2013 | Lastrucci | H02K 33/16 |
| | | | 381/400 |
| 2014/0062224 A1* | 3/2014 | Kim | H02K 33/16 |
| | | | 310/15 |
| 2014/0084710 A1* | 3/2014 | Endo | H02K 33/16 |
| | | | 310/25 |
| 2014/0265651 A1* | 9/2014 | Kim | H02K 33/16 |
| | | | 310/25 |
| 2017/0216884 A1* | 8/2017 | Katada | H02K 33/02 |
| 2017/0250596 A1* | 8/2017 | Son | H02K 1/34 |
| 2018/0212487 A1* | 7/2018 | Jiang | H02K 33/16 |
| 2018/0219465 A1* | 8/2018 | Katada | B06B 1/045 |
| 2019/0107312 A1* | 4/2019 | Noh | F04B 19/04 |
| 2019/0366383 A1* | 12/2019 | Yoshimura | F16F 1/328 |
| 2020/0044539 A1 | 2/2020 | Tang et al. | |
| 2021/0384810 A1* | 12/2021 | Shirato | H02K 33/18 |

OTHER PUBLICATIONS

Hirata, et al., "Vibration Motor and Tactile Device", U.S. Appl. No. 17/371,026, filed Jul. 8, 2021.

Hirata, et al., "Vibration Motor and Tactile Device", U.S. Appl. No. 17/369,977, filed Jul. 8, 2021.

* cited by examiner

VIBRATION MOTOR

CROSS REFERENCE TO RELATED APPLICATIONS

The present application claims priority under 35 U.S.C. § 119 to Japanese Application No. 2020-119456 filed on Jul. 10, 2020, and No. 2021-013174 filed on Jan. 29, 2021, the entire contents of which are hereby incorporated herein by reference.

FIELD OF THE INVENTION

The disclosure relates to a vibration motor.

BACKGROUND

Conventionally, a vibration motor as a vibration generation device is often included in devices of various types such as mobile devices such as smartphones. Vibration motors are often used, for example, in applications such as a function of notifying a user of an incoming call, an alarm, or the like, or a function of tactile feedback in a human interface.

A conventional vibration motor may include, for example, a housing, a coil, an elastic member, and a movable element. The movable element includes a magnet. The movable element and the housing are connected by an elastic member. The movable element vibrates when the coil is energized and a magnetic field is generated.

However, when the above-described housing is formed of a magnetic material, there has been a likelihood that a phenomenon in which the movable element is attracted and sticks to an inner surface of the housing by an attractive force and the movable element is not moved will occur. Further, the reason why the housing is formed of a magnetic material is to form a magnetic circuit to increase a magnetic force.

SUMMARY

According to an exemplary embodiment of the disclosure, there is provided a vibration motor including a stationary part, and a movable element which has a magnet and can vibrate in one direction. The stationary part includes a coil which applies a driving force to the magnet due to energization, a housing which houses the movable element and the coil therein, a first lid part which closes an end portion of the housing on one side in the one direction, and a first bearing part. The first bearing part is disposed inside the housing on the other side in the one direction from the first lid part. The first bearing part includes a bearing inner circumferential surface disposed with a gap therebetween with respect to an outer circumferential surface of a portion of the movable element on one side in the one direction.

The above and other elements, features, steps, characteristics and advantages of the disclosure will become more apparent from the following detailed description of the preferred embodiments with reference to the attached drawings.

DETAILED DESCRIPTION

Hereinafter, exemplary embodiments of the disclosure will be described with reference to the drawings.

In the drawings, one direction in which a movable element vibrates is illustrated as an X direction, one side in the one direction is illustrated as X1, and the other side in the one direction is illustrated as X2.

Figure 1:
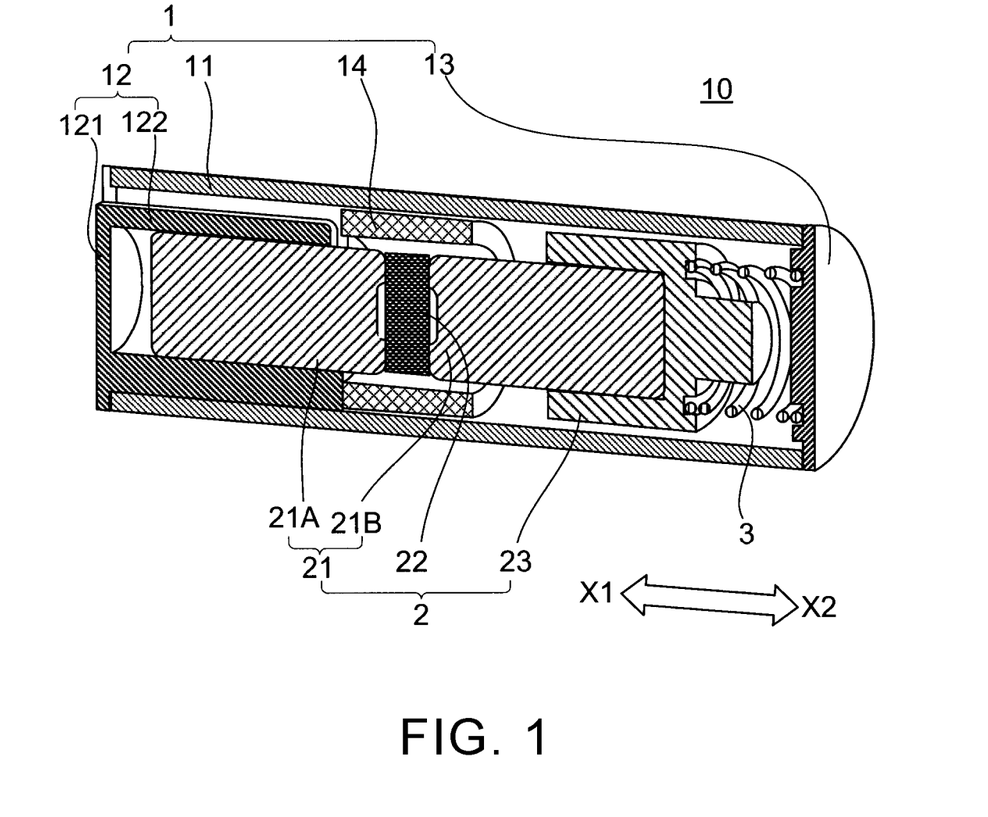
FIG. 1 is a cross-sectional perspective view of a vibration motor according to a first exemplary embodiment of the disclosure.
Figure 2:
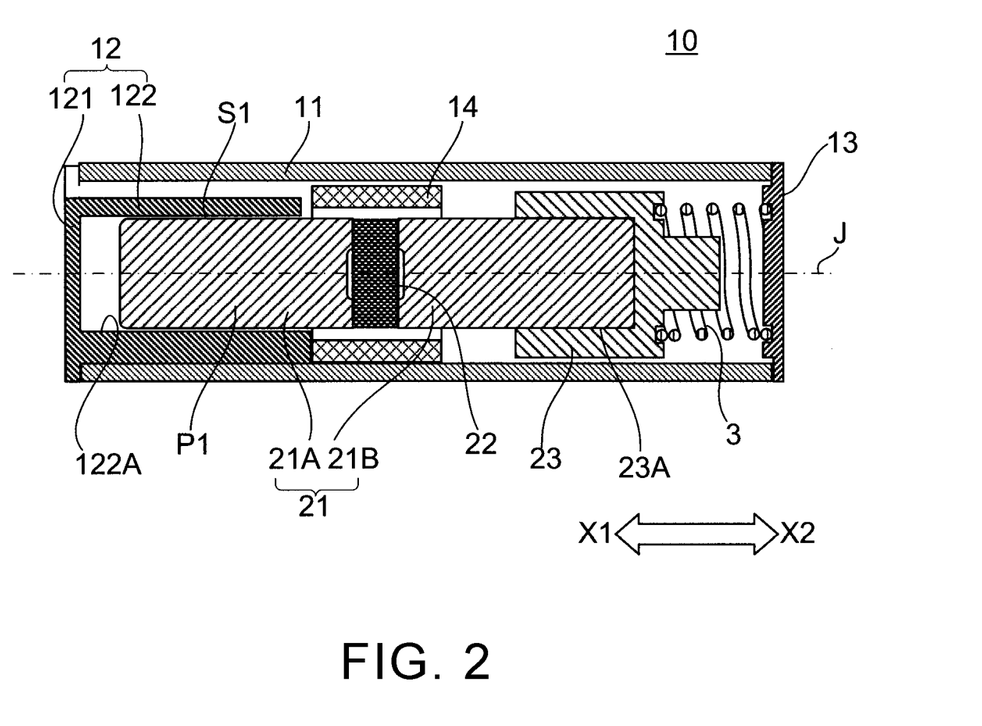
FIG. 2 is a side cross-sectional view of the vibration motor illustrated in FIG. 1.

First, a first exemplary embodiment of the disclosure will be described. FIG. 1 is a cross-sectional perspective view of a vibration motor 10 according to a first exemplary embodiment of the disclosure. FIG. 2 is a side cross-sectional view of the vibration motor 10 illustrated in FIG. 1.

The vibration motor 10 includes a stationary part 1, a movable element 2, and an elastic member 3. The movable element 2 can vibrate in one direction (X direction).

The stationary part 1 includes a housing 11, a first sleeve bearing 12, and a coil 14. The housing 11 is a cylindrical member extending in one direction. Further, the housing 11 is not limited to a cylindrical shape, and may be, for example, a quadrangular cylindrical shape or the like. The housing 11 is formed of a magnetic material. The above-described magnetic material may be, for example, stainless steel.

The first sleeve bearing 12 includes a first lid part 121 and a first bearing part 122. That is, the stationary part 1 includes the first lid part 121 and the first bearing part 122. The first lid part 121 has a substantially disc shape. The first bearing part 122 has a substantially cylindrical shape that protrudes from the first lid part 121 toward the other side in one direction and extends in one direction. Further, the first lid part 121 is not limited to a substantially disc shape, and may be, for example, a substantially quadrangular plate shape, and the first bearing part 122 is not limited to a substantially cylindrical shape, and may be, for example, a substantially quadrangular cylindrical shape. The first lid part 121 and the first bearing part 122 form the first sleeve bearing 12 serving as a single member. Further, the first lid part 121 and the first bearing part 122 may be separate bodies. In that case, the first lid part 121 and the housing 11 may form a single member.

The first sleeve bearing 12 is inserted into the housing 11 from one side of the housing 11 in one direction and fixed to the housing 11. The first lid part 121 closes an end portion on one side of the housing 11 in one direction. The first bearing part 122 is disposed inside the housing 11 on the other side of the first lid part 121 in one direction.

The first sleeve bearing 12 may be formed of, for example, a resin having a low friction coefficient and a low wear property. As the resin described above, for example, POM (polyacetal) may be used.

The stationary part 1 includes a second lid part 13. The second lid part 13 has a substantially disc shape and closes an end portion on the other side of the housing 11 in one direction. Further, the second lid part 13 is not limited to a substantially disc shape, and may be, for example, a substantially quadrangular plate shape. The housing 11, the first lid part 121, and the second lid part 13 form a body.

The coil 14 is formed by winding a lead wire around a central axis J extending in one direction of the movable element 2 and is fixed to an inner surface of the housing 11. That is, the housing 11 houses the coil 14 inside. The coil 14 generates a magnetic field when it is energized. The coil 14 is fixed to an end surface of the first bearing part 122 on the other side in one direction.

The movable element 2 includes a magnet 21, and a magnetic material 22, and a holder 23 and is housed inside the housing 11. The magnet 21 includes a magnet part 21A on one side in one direction and a magnet part 21B on the other side in one direction. The magnetic material 22 is sandwiched by the magnet parts 21A and 21B from both sides in one direction. The magnet parts 21A and 21B and the magnetic material 22 form a substantially columnar shape extending in one direction. Further, the magnet parts 21A and 21B and the magnetic material 22 are not limited to forming a substantially columnar shape, and may form, for example, a substantially quadrangular columnar shape.

The other side of the magnet part 21A in one direction is an N pole, and one side thereof in one direction is an S pole. One side of the magnet part 21B in one direction is an N pole, and the other side thereof in one direction is an S pole. That is, the N poles face each other in one direction with the magnetic material 22 sandwiched therebetween. When the housing 11 is formed of a magnetic material, a magnetic field generated by the magnet 21 and the coil 14 is inhibited from leaking to the outside of the vibration motor 10, and a magnetic force can be increased. Further, the S poles may face each other in one direction with the magnetic material 22 sandwiched therebetween.

The holder 23 holds a portion of the magnet part 21B (the magnet 21) on the other side in one direction. The holder 23 includes a columnar recessed part 23A that is recessed to the other side in one direction in a columnar shape. A portion of the magnet part 21B on the other side in one direction is fitted into the columnar recessed part 23A. The holder 23 functions as a weight (sinker) and may be formed of, for example, a tungsten alloy.

The elastic member 3 is a coil spring that is wound around the central axis J. An end portion of the elastic member 3 on one side in one direction is fixed to an end surface of the holder 23 on the other side in one direction, and an end portion of the elastic member 3 on the other side in one direction is fixed to an inner surface of the second lid part 13. Fixing of the elastic member 3 may be performed, for example, by adhesion. That is, the elastic member 3 is disposed between the holder 23 and the second lid part 13. Further, fixing of the elastic member 3 is not limited to adhesion, and may also be performed by, for example, welding, fitting, caulking, or the like.

The first bearing part 122 has a cylindrical bearing inner circumferential surface 122A. In a case of non-operating state in which the coil 14 is not energized and the movable element 2 is in a stationary state, a portion of the magnet part 21A on one side in one direction is housed inside the first bearing part 122 with a gap S1 between itself and the bearing inner circumferential surface 122A. That is, the first bearing part 122 has the bearing inner circumferential surface 122A disposed with the gap S1 with respect to an outer circumferential surface of a portion P1 of the movable element 2 on one side in one direction. Further, FIGS. 1 and 2 illustrate the vibration motor 10 in a non-operating state.

In a non-operating state, the magnetic material 22 is positioned on an inner side of the coil 14. In a non-operating state, although the elastic member 3 has a natural length, fixing of the elastic member 3 to the movable element 2 by the holder 23 is facilitated.

When the coil 14 is energized, a driving force is applied to the magnet 21 by an interaction between a magnetic field generated by the coil 14 and a magnetic field generated by the magnet 21. That is, when the driving force is applied to the movable element 2, the movable element 2 vibrates in one direction.

At the time of vibration of the movable element 2, when the movable element 2 comes into contact with the bearing inner circumferential surface 122A of the first bearing part 122, since the movable element 2 slides with respect to the stationary first bearing part 122, movement of the movable element 2 is limited to movement in one direction. Thereby, occurrence of a phenomenon in which the movable element 2 is attracted and sticks to the housing 11 formed of a magnetic material by an attractive force can be suppressed, and the movable element 2 can be stably operated.

Also, when the movable element 2 moves to one side in one direction, the movable element 2 compresses air contained in a space surrounded by the first bearing part 122 and the first lid part 121, and thereby an effect of a damper is exhibited. Thereby, the movable element 2 is inhibited from coming into contact with the first lid part 121.

Also, when a configuration of a vibration motor in which two elastic members are provided by disposing the elastic members on one side and the other side in one direction is assumed, there is a likelihood that characteristics of the elastic members will be inconsistent, and thereby product performance such as a resonance frequency is difficult to be stabilized. On the other hand, in the configuration of the present embodiment, since there is only one elastic member 3, stabilization in product performance can be achieved. Also, compared to the configuration in which a holder and an elastic member are provided on one side in one direction when two elastic members are provided as described above, in the configuration of the present embodiment, costs can be reduced because the above-described holder and the above-described elastic member can be replaced with the first bearing part 122.

Hereinafter, various modified examples of the above-described first embodiment will be described. Further, the various modified examples to be described below can be implemented in appropriate combinations.

Figure 3:
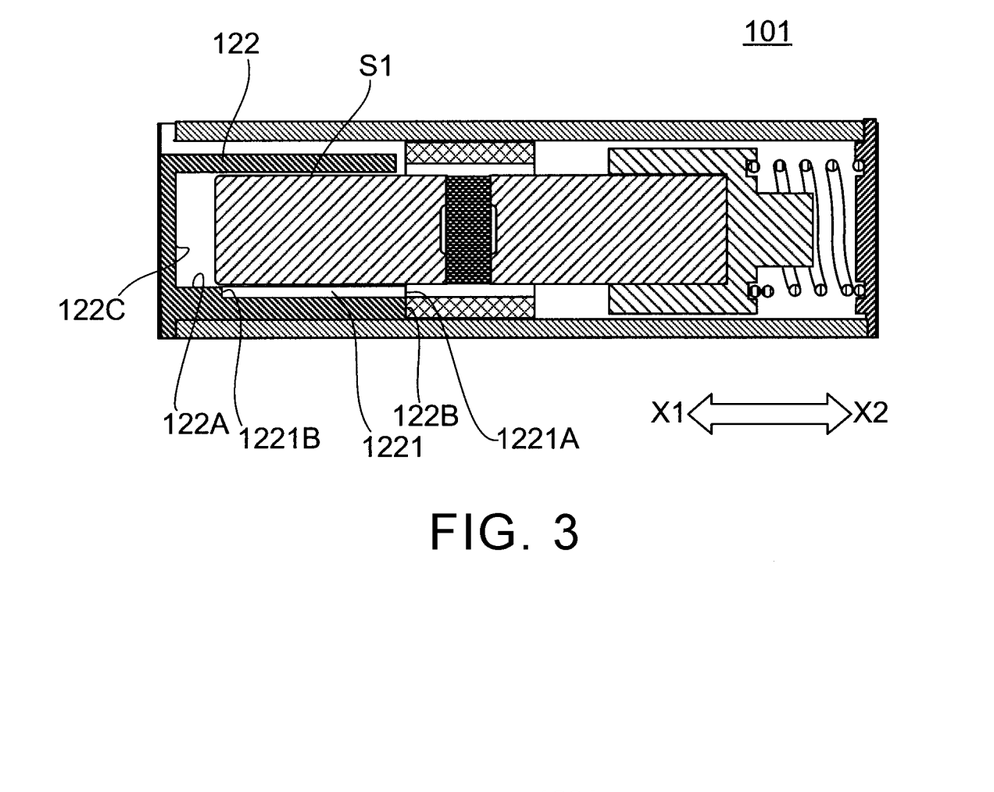
FIG. 3 is a side cross-sectional view of a vibration motor according to a first modified example.

FIG. 3 is a side cross-sectional view of a vibration motor 101 according to a first modified example. As illustrated in FIG. 3, in the first modified example, a groove part 1221 is provided in the first bearing part 122. The groove part 1221 is provided on the bearing inner circumferential surface 122A. The groove part 1221 extends in one direction. Further, the groove part 1221 is included in the gap S1.

Figure 4:
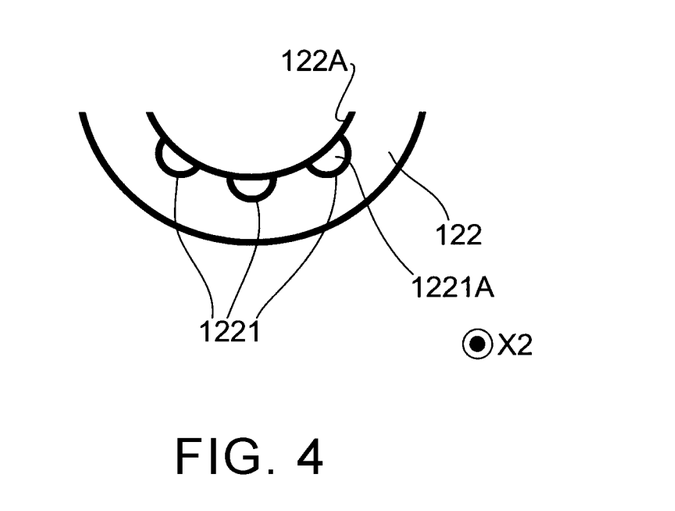
FIG. 4 is a front view of a part of a first bearing part from the other side in one direction.

FIG. 4 is a front view of a part of the first bearing part 122 from the other side in one direction. As illustrated in FIG. 4, a plurality of groove parts 1221 is provided. Further, the number of groove parts 1221 may be one. That is, the bearing inner circumferential surface 122A includes at least one groove part 1221 provided in one direction.

An end surface 1221A of the groove part 1221 on the other side in one direction opens at an end surface 122B of the first bearing part 122 on the other side in one direction. That is, the end surface 1221A of the groove part 1221 on the other side in one direction is positioned at the end surface 122B of the first bearing part 122 on the other side in one direction.

Also, an end surface 1221B of the groove part 1221 on one side in one direction is positioned on the other side in one direction with respect to an end surface 122C of the first bearing part 122 on one side in one direction.

Figure 5:
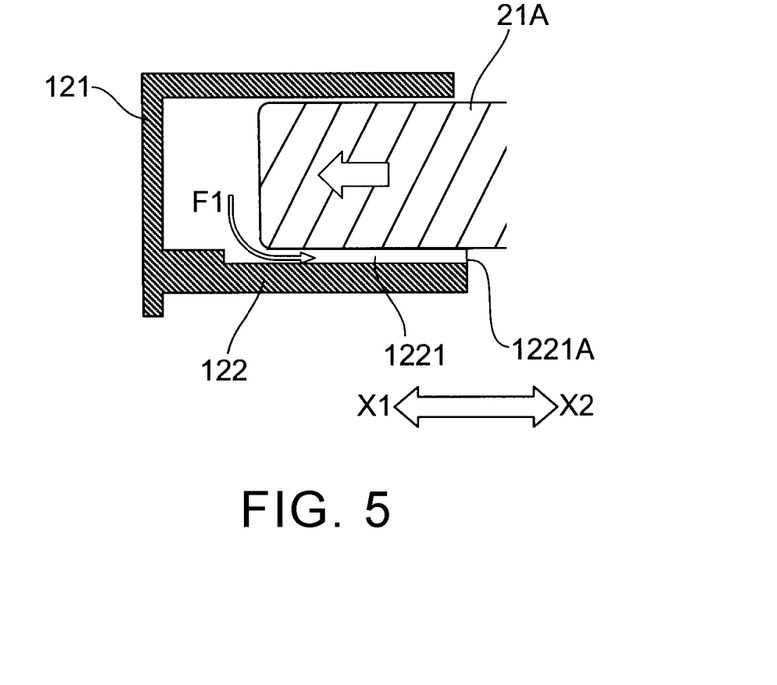
FIG. 5 is a view schematically illustrating a state of air escape in the first modified example.

In such a first modified example, as illustrated in FIG. 5, when the movable element 2 (the magnet part 21A) moves to one side in one direction in an operating state, air compressed by the movable element 2 escapes to the groove part 1221. Further, an air flow F1 is denoted in FIG. 5. Thereby, the effect of a damper is weakened, and sliding ability of the movable element 2 can be improved.

Also, since the air that has escaped to the groove part 1221 flows out to the outside from the end surface 1221A on the other side in one direction, the air can easily escape and the sliding ability of the movable element 2 can be further improved.

Figure 6:
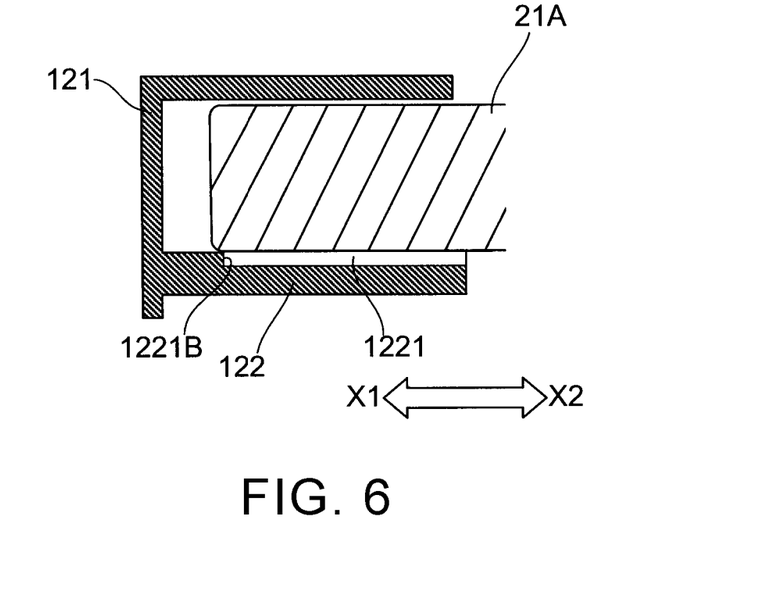
FIG. 6 is a view illustrating a state in which a movable element in the first modified example has moved to a position past a groove part.

Also, as illustrated in FIG. 6, when the movable element 2 moves in one direction, if the movable element 2 moving toward one side in one direction passes the end surface 1221B on one side in one direction, the escape of the air is suppressed and resistance due to the air increases. Therefore, the movable element 2 can be inhibited from coming into contact with the first lid part 121.

Figure 7:
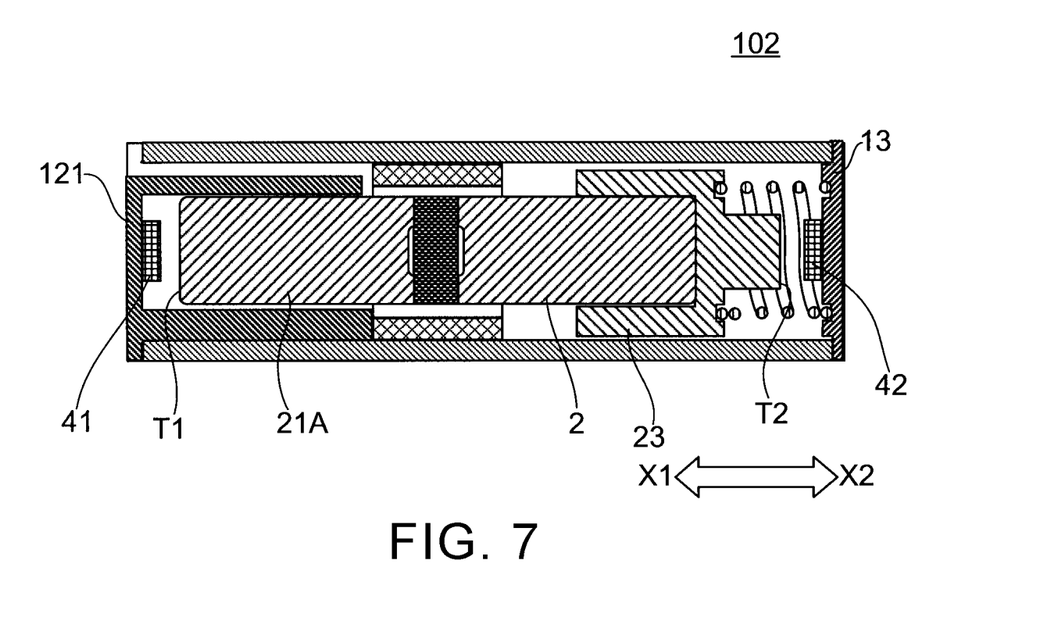
FIG. 7 is a side cross-sectional view of a vibration motor according to a second modified example.

FIG. 7 is a side cross-sectional view of a vibration motor 102 according to a second modified example. The vibration motor 102 includes buffer members 41 and 42. The buffer members 41 and 42 may be formed of, for example, silicon rubber, thermoplastic polyurethane, or the like.

The buffer member 41 is fixed to an inner surface of the first lid part 121 facing an end surface T1 on one side in one direction of the movable element 2 (the magnet part 21A) in one direction. The buffer member 42 is fixed to an inner surface of the second lid part 13 facing an end surface T2 on the other side in one direction of the movable element 2 (the holder 23) in one direction. Fixing of the buffer members 41 and 42 may be performed by, for example, a double-sided tape.

Further, only one of the buffer members 41 and 42 may be provided. That is, the stationary part 1 includes the buffer members 41 and 42 disposed on at least one of the inner surface of the first lid part 121 facing the end surface T1 on one side in one direction of the movable element 2 in one direction and the inner surface of the second lid part 13 facing the end surface T2 on the other side in one direction of the movable element 2 in one direction.

The movable element 2 does not come into contact with the buffer members 41 and 42 during a normal operation. However, when the vibration motor 102 is dropped, the end surface T1 of the movable element 2 on one side in one direction may come into contact with the buffer member 41 or the end surface T2 of the movable element 2 on the other side in one direction may come into contact with the buffer member 42. Therefore, an unwanted sound or the like due to a contact between the movable element 2 and the stationary part 1 can be suppressed.

As a third modified example, in the vibration motor 10 according to the above-described first embodiment, a lubricant or a magnetic fluid may be disposed in the gap S1. The lubricant may be, for example, an oil. When a magnetic fluid is disposed, the magnetic fluid moves together with the magnet part 21A.

Thereby, the movable element 2 easily moves in one direction. Also, wear of the movable element 2 can be suppressed and a prolonged life can be achieved. Further, generation of sound due to friction between the movable element 2 and the first bearing part 122 can be suppressed, and quietness can be improved.

Figure 8:
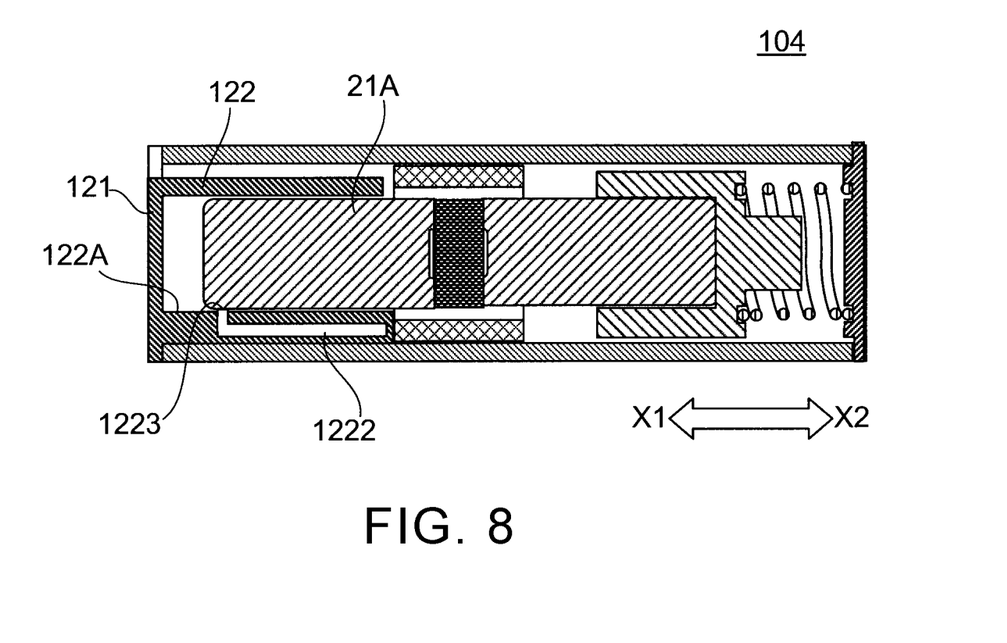
FIG. 8 is a side cross-sectional view of a vibration motor according to a fourth modified example.

FIG. 8 is a side cross-sectional view of a vibration motor 104 according to a fourth modified example. As illustrated in FIG. 8, in the vibration motor 104, the first bearing part 122 includes an air passage 1222 and an air hole 1223. The air passage 1222 is disposed in one direction. The air hole 1223 communicates with the air passage 1222 and is disposed on the bearing inner circumferential surface 122A.

In FIG. 8, the other side of the air passage 1222 in one direction does not extend to the end surface of the first bearing part 122 on the other side in one direction. As in an embodiment to be described later, the air passage may extend to the end surface of the first bearing part 122 on the other side in one direction and open. Also, the air passage may extend to one side of the air hole 1223 in one direction. In that case, the air passage may extend to an end surface of the first lid part 121 on one side in one direction and open.

Figure 9:
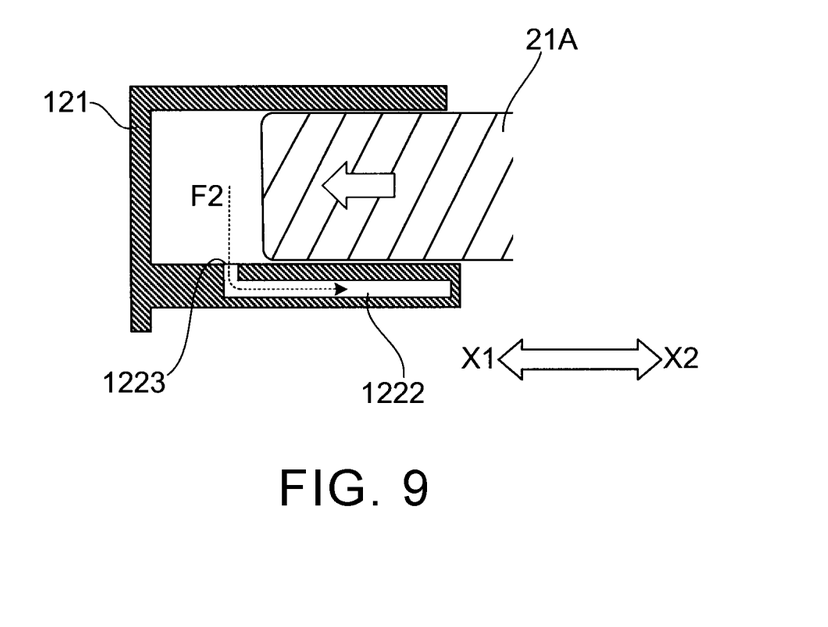
FIG. 9 is a view schematically illustrating a state of air escape in the fourth modified example.
Figure 10:
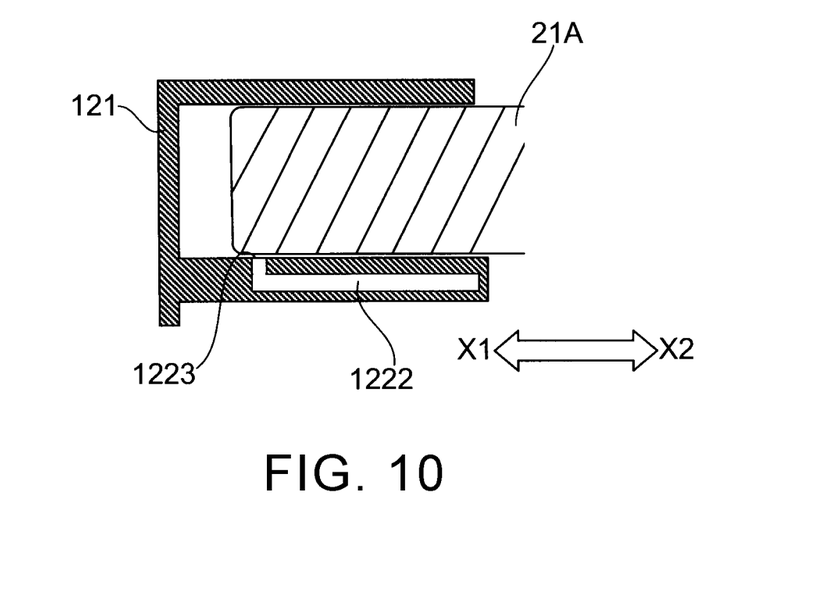
FIG. 10 is a view illustrating a state in which a movable element in the fourth modified example has moved to a position past an air hole.

According to the configuration illustrated in FIG. 8, as illustrated in FIG. 9, when the movable element 2 moves in one direction, in a case in which the movable element 2 is positioned on the other side of the air hole 1223 in one direction, air compressed by the movable element 2 flows into the air passage 1222 through the air hole 1223, and the movable element 2 easily moves to one side in one direction. Further, an air flow F2 is denoted in FIG. 9. Then, as illustrated in FIG. 10, when the movable element 2 passes the air hole 1223 toward one side in one direction, the air hole 1223 is closed to suppress escape of the air, and resistance due to the air increases. Accordingly, the movable element 2 can be inhibited from coming into contact with the first lid part 121.

Further, the set of the air passage and the air hole is not limited to one set, and a plurality of sets may be provided to be aligned in the circumferential direction of the first bearing part 122.

Figure 11:
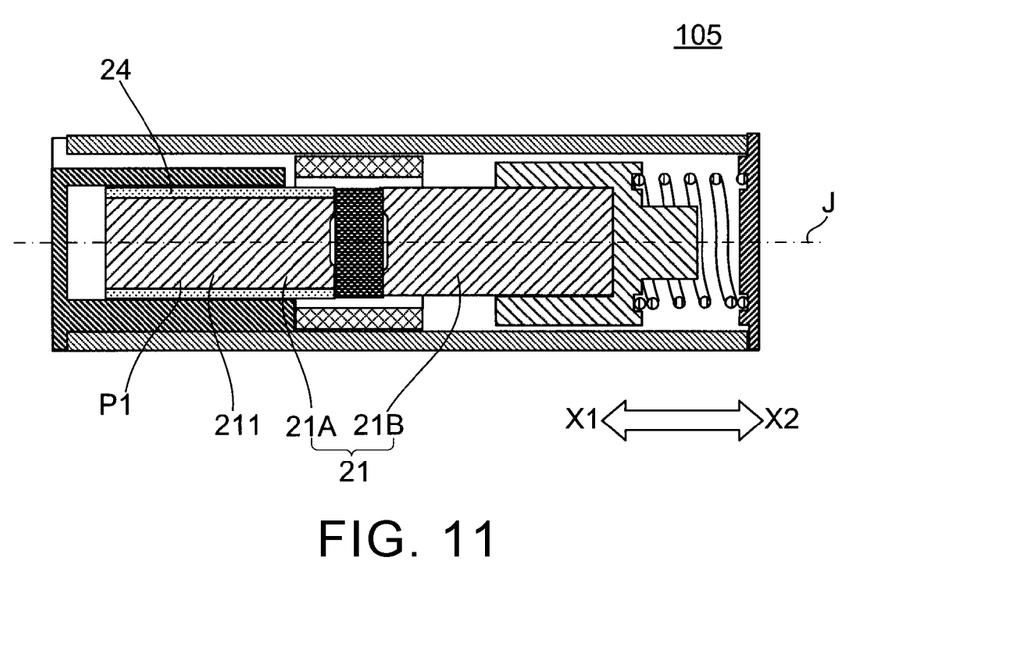
FIG. 11 is a side cross-sectional view of a vibration motor according to a fifth modified example.

FIG. 11 is a side cross-sectional view of a vibration motor 105 according to a fifth modified example. As illustrated in FIG. 11, in the vibration motor 105, a first outer circumferential member 24 that covers an outer circumferential surface of the magnet part 21A is formed. That is, the portion P1 of the movable element 2 on one side in one direction includes a portion 211 of the magnet 21 (the magnet part 21A) and the first outer circumferential member 24 disposed on the outer circumferential surface of the portion 211. The first outer circumferential member 24 may be formed of, for example, a fluorine layer or the like having a low friction coefficient.

According to such a configuration, wear of the magnet 21 due to the sliding operation of the movable element 2 in contact with the bearing inner circumferential surface 122A can be suppressed, and change in magnetic flux due to the wear can be suppressed. Also, a rattling generated due to wear of the movable element 2 when a portion of the movable element 2 on the other side in one direction moves to a direction other than one direction can be suppressed. Accordingly, coaxiality of the movable element 2 can be improved. Further, coaxiality indicates a deviation of an axial line from a specified axial line to be matched. Here, the specified axis line is the central axis J.

Figure 12:
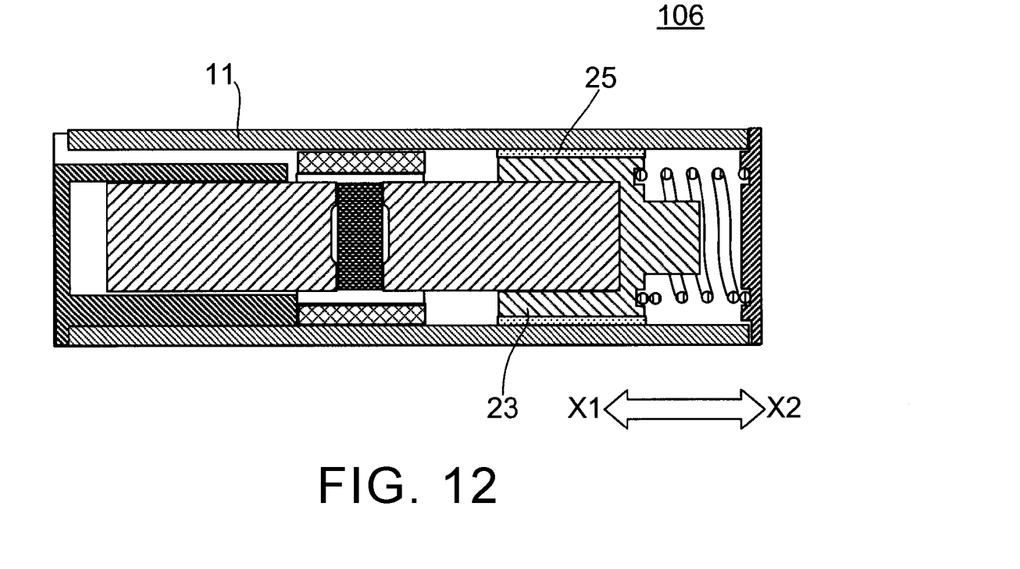
FIG. 12 is a side cross-sectional view of a vibration motor according to a sixth modified example.

FIG. 12 is a side cross-sectional view of a vibration motor 106 according to a sixth modified example. As illustrated in FIG. 12, in the vibration motor 106, the movable element 2 includes a second outer circumferential member 25. The second outer circumferential member 25 is disposed on an outer circumferential surface of the holder 23 and slides with respect to the inner surface of the housing 11. As in the first outer circumferential member 24, the second outer circumferential member 25 may be formed of, for example, a fluorine layer or the like.

According to such a configuration, a rattling caused by the portion of the movable element 2 on the other side in one direction moving to a direction other than one direction can be suppressed and coaxiality of the movable element 2 can be improved. Also, when a configuration in which the outer circumferential member 25 is not provided is assumed, in order to inhibit the movable element 2 from being attracted and sticking to the housing 11 formed of a magnetic material by an attractive force, it is necessary to provide a gap between the outer circumferential surface of the holder 23 and the inner surface of the housing 11 to some extent. Then, when the vibration motor is reduced in size, a size of the holder 23 as a weight is reduced. On the other hand, in the present embodiment, since the outer circumferential member 25 is provided, even when the outer circumferential surface of the holder 23 is brought close to the inner surface of the housing 11, the movable element 2 can be inhibited from being attracted and sticking, and thereby the movable element 2 can be stably operated. Also, also when the vibration motor 106 is reduced in size, the size of the holder 23 as a weight can be increased. Accordingly, vibration performance of the vibration motor 106 can be improved.

Figure 13:
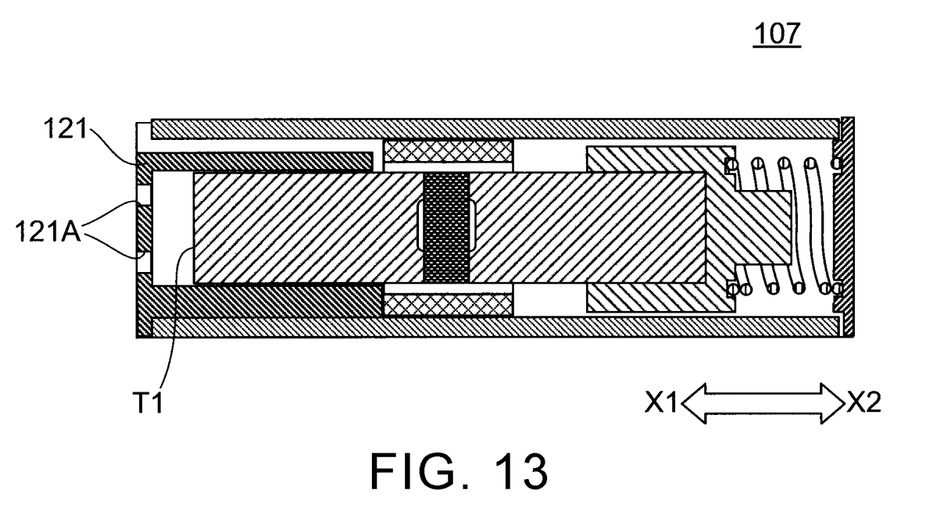
FIG. 13 is a side cross-sectional view of a vibration motor according to a seventh modified example.

FIG. 13 is a side cross-sectional view of a vibration motor 107 according to a seventh modified example. As illustrated in FIG. 13, in the vibration motor 107, the first lid part 121 has a through hole 121A penetrating in one direction. A plurality of through holes 121A is provided. Further, the number of through holes 121A may be one. That is, the first lid part 121 has at least one through hole 121A penetrating in one direction. Also, the through hole 121A is disposed at an inner surface of the first lid part 121 facing the end surface T1 on one side in one direction of the movable element 2 in one direction.

According to such a configuration, when the movable element 2 moves in one direction, since air escapes from the through hole 121A to the outside, the movable element 2 can easily move.

Figure 14:
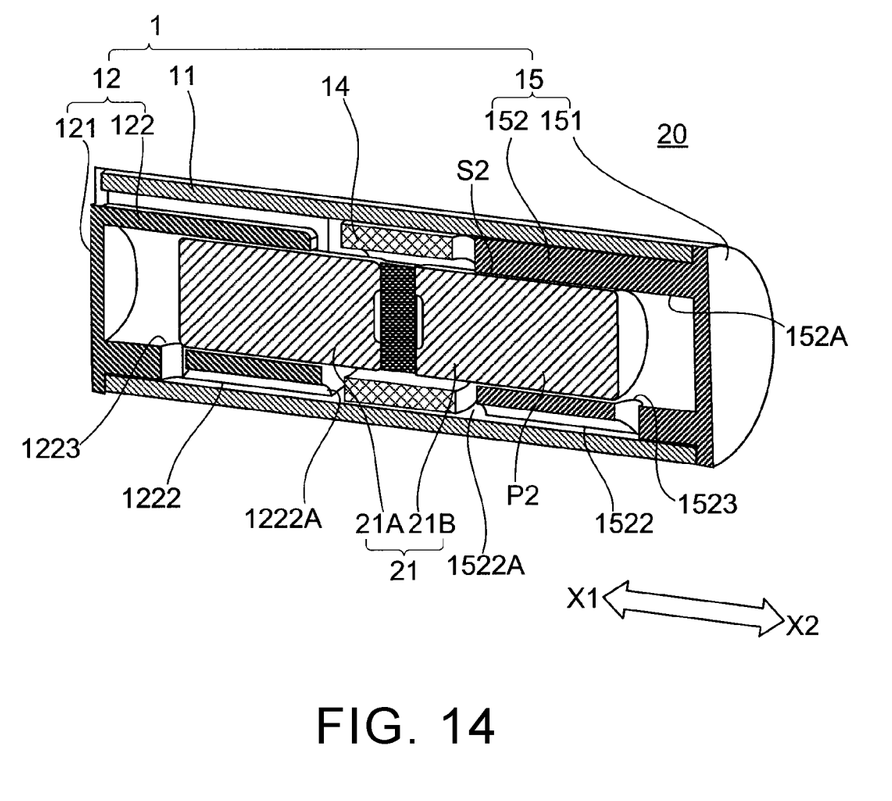
FIG. 14 is a cross-sectional perspective view of a vibration motor according to a second exemplary embodiment of the disclosure.

Next, a second exemplary embodiment of the disclosure will be described. FIG. 14 is a cross-sectional perspective view of a vibration motor 20 according to a second exemplary embodiment of the disclosure. A difference in a configuration of the vibration motor 20 from that of the first embodiment is that it includes a second sleeve bearing 15.

A stationary part 1 includes the second sleeve bearing 15. The second sleeve bearing 15 includes a second lid part 151 and a second bearing part 152. That is, the stationary part 1 includes the second lid part 151 and the second bearing part 152.

The second lid part 151 has a substantially disc shape. The second bearing part 152 has a substantially cylindrical shape that protrudes from the second lid part 151 toward one side in one direction and extends in one direction. The second lid part 151 and the second bearing part 152 form the second sleeve bearing 15 as a single member. Further, various modified examples of the configuration of the second sleeve bearing 15 are the same as those of the first sleeve bearing 12 described above.

The second sleeve bearing 15 is inserted into a housing 11 from the other side of the housing 11 in one direction and fixed to the housing 11. The second lid part 151 closes an end portion on the other side of the housing 11 in one direction. The second bearing part 152 is disposed inside the housing 11 on the other side of a first bearing part 122 in one direction and on one side of the second lid part 151 in one direction.

The second sleeve bearing 15 may be formed of, for example, a resin having a low friction coefficient and a low wear property. As the resin described above, for example, POM (polyacetal) may be used.

The second bearing part 152 has a cylindrical bearing inner circumferential surface 152A. In a case of non-operating state, a portion of a magnet part 21B on the other side in one direction is housed inside the second bearing part 152 with a gap S2 between itself and the bearing inner circumferential surface 152A. That is, the second bearing part 152 has the bearing inner circumferential surface 152A disposed with the gap S2 with respect to an outer circumferential surface of a portion P2 of a movable element 2 on the other side in one direction. Further, FIG. 14 illustrates the vibration motor 20 in a non-operating state.

When a coil 14 is energized, a driving force is applied to a magnet 21, and the movable element 2 vibrates in one direction. At the time of vibration of the movable element 2, when the movable element 2 comes into contact with the bearing inner circumferential surfaces 122A and 152A, since the movable element 2 slides with respect to the stationary first bearing part 122 and second bearing part 152, movement of the movable element 2 is limited to movement in substantially one direction. Thereby, the movable element 2 can be inhibited from sticking, and the movable element 2 can be stably operated.

Also, when the movable element 2 moves to the other side in one direction, the movable element 2 compresses air contained in a space surrounded by the second bearing part 152 and the second lid part 151, an effect of a damper is exhibited, and the movable element 2 can be inhibited from coming into contact with the second lid part 151.

Further, in the present embodiment, since the holder and the elastic member are replaced with the bearing part, costs can be further reduced compared to the first embodiment.

Further, in the configuration illustrated in FIG. 14, the first bearing part 122 has an air passage 1222 and an air hole 1223, and the second bearing part 152 has an air passage 1522 and an air hole 1523.

The air passage 1222 extends toward the other side in one direction from the air hole 1223 to an end surface of the first bearing part 122 on the other side in one direction and opens. That is, an end surface 1222A of the air passage 1222 on the other side in one direction is positioned at the end surface of the first bearing part 122 on the other side in one direction.

Thereby, when the movable element 2 moves to one side in one direction, air compressed by the movable element 2 flows into the air passage 1222 through the air hole 1223 and flows out from the end surface 1222A on the other side in one direction to the outside. Accordingly, the air easily escapes, and the movable element 2 easily moves to one side in one direction.

The air passage 1522 extends toward one side in one direction from the air hole 1523 to an end surface of the second bearing part 152 on one side in one direction and opens. That is, an end surface 1522A of the air passage 1522 on one side in one direction is positioned at the end surface of the second bearing part 152 on one side in one direction.

Thereby, when the movable element 2 moves to the other side in one direction, air compressed by the movable element 2 flows into the air passage 1522 through the air hole 1523 and flows out from the end surface 1522A on one side in one direction to the outside. Accordingly, the air easily escapes, and the movable element 2 easily moves to the other side in one direction. Further, when the movable element 2 passes the air hole 1523 toward the other side in one direction, since the air hole 1523 is closed, the effect of a damper is strengthened, and the movable element 2 can be inhibited from coming into contact with the second lid part 151.

Further, various modified examples of the first embodiment described above can be appropriately applied to the present embodiment.

The exemplary embodiments of the disclosure have been described above. Further, the scope of the disclosure is not limited to the above-described embodiments. The disclosure can be implemented with various modifications made to the above-described embodiments without departing from the gist of the disclosure.

The disclosure can be used, for example, in vibration motors mounted on devices of various types such as mobile devices.

Features of the above-described preferred embodiments and the modified examples thereof may be combined appropriately as long as no conflict arises.

While preferred embodiments of the disclosure have been described above, it is to be understood that variations and modified examples will be apparent to those skilled in the art without departing from the scope and spirit of the disclosure. The scope of the disclosure, therefore, is to be determined solely by the following claims.

What is claimed is:

1. A vibration motor comprising:
    a stationary part; and
    a movable element, including a magnet and being able to vibrate in one direction,
    wherein the stationary part comprises:
        a coil which applies a driving force to the magnet due to energization;
        a housing which houses the movable element and the coil therein;
        a first lid part which closes an end portion of the housing on one side in the one direction; and
        a first bearing part,
    wherein the first bearing part is disposed inside the housing on the other side in the one direction from the first lid part, and
    the first bearing part includes a bearing inner circumferential surface disposed with a gap therebetween with respect to an outermost circumferential surface of a portion of the magnet on one side in the one direction, and
    the first bearing part protrudes from the first lid part toward the other side in the one direction and extends in the one direction, and
    the vibration motor further comprising:
    a single elastic member, wherein
    the stationary part includes a second lid part which closes an end portion of the housing on the other side in the one direction,
    the movable element includes a holder which holds a portion of the magnet on the other side in the one direction, and
    the single elastic member is disposed between the holder and the second lid part.

2. The vibration motor according to claim 1, wherein the stationary part comprises a buffer member, and
    the buffer member is disposed on at least one of:
        an inner surface of the first lid part facing an end surface on one side in the one direction of the movable element in the one direction, and
        an inner surface of the second lid part, which closes the end portion of the housing on the other side in the one direction, facing an end surface on the other side in the one direction of the movable element in the one direction.

3. The vibration motor according to claim 1, wherein a lubricant or a magnetic fluid is disposed in the gap.

4. The vibration motor according to claim 1, wherein the portion of the movable element on one side in the one direction comprises:
    a portion of the magnet; and
    a first circumferential member, disposed on a circumferential surface of the portion.

5. The vibration motor according to claim 1, wherein the first lid part includes at least one through hole penetrating in the one direction; and
    the through hole is disposed on an inner surface of the first lid part facing an end surface on one side in the one direction of the movable element in the one direction.

6. The vibration motor according to claim 1, wherein the movable element includes a second outer circumferential member, disposed on an outer circumferential surface of the holder and configured to slide with respect to an inner surface of the housing.

7. The vibration motor according to claim 1, wherein the stationary part comprises:
    a second bearing part,
    wherein the second bearing part is disposed inside the housing on the other side of the first bearing part in the one direction and on one side of the second lid part in the one direction, and
    the second bearing part includes a bearing inner circumferential surface disposed with a gap therebetween with respect to an outer circumferential surface of a portion of the movable element on the other side in the one direction.

8. The vibration motor according to claim 1, wherein the first bearing part comprises:
    an air passage, disposed in the one direction; and
    an air hole, communicating with the air passage and disposed on the bearing inner circumferential surface.

9. The vibration motor according to claim 8, wherein an end surface of the air passage on the other side in the one direction is positioned at an end surface of the first bearing part on the other side in the one direction.

10. The vibration motor according to claim 1, wherein the bearing inner circumferential surface includes at least one groove part provided in the one direction.

11. The vibration motor according to claim 10, wherein an end surface of the groove part on the other side in the one direction is positioned at an end surface of the first bearing part on the other side in the one direction.

12. The vibration motor according to claim 10, wherein an end surface of the groove part on one side in the one direction is positioned on the other side in the one direction with respect to an end surface of the first bearing part on one side in the one direction.

* * * * *